United States Patent [19]

Smith et al.

[11] 4,312,686
[45] Jan. 26, 1982

[54] PRINTED AND EMBOSSED FLOOR COVERING AND METHOD AND APPARATUS FOR ITS MANUFACTURE

[75] Inventors: Merrill M. Smith; Ernest R. Holmstrom, both of Morrisville, Pa.; Donald C. Ferguson, Trenton, N.J.

[73] Assignee: American Biltrite Inc., Cambridge, Mass.

[21] Appl. No.: 120,536

[22] Filed: Feb. 11, 1980

[51] Int. Cl.³ .................. B32B 31/00; B26D 5/00; B31F 1/20; D04H 1/00
[52] U.S. Cl. .................................... 156/209; 156/220; 156/235; 156/249; 156/277; 156/353; 264/118
[58] Field of Search ............... 156/220, 237, 240, 230, 156/277, 231, 219, 247, 235, 249, 311, 244.18, 261, 209, 361, 353, 351; 101/34, 181; 427/270, 203, 374 R; 264/118, 119

[56] References Cited

U.S. PATENT DOCUMENTS

| | | | |
|---|---|---|---|
| 2,559,649 | 7/1951 | Little et al. | 156/231 |
| 3,339,521 | 9/1967 | Spencer | 427/203 |
| 3,655,312 | 4/1972 | Erb et al. | 156/220 |
| 3,694,634 | 9/1972 | Horst et al. | 101/181 |
| 3,741,851 | 6/1973 | Erb et al. | 156/220 |
| 3,860,440 | 1/1975 | Nakajo | 156/231 |
| 3,915,785 | 10/1975 | Müller | 156/351 |
| 4,070,435 | 1/1978 | Lewicki, Jr. et al. | 156/220 |
| 4,131,663 | 12/1978 | Lewicki, Jr. | 156/220 |
| 4,158,070 | 6/1979 | Lewicki, Jr. et al. | 427/374 R |
| 4,187,131 | 2/1980 | Shortway | 156/220 |
| 4,198,456 | 4/1980 | Adams et al. | 427/270 |
| 4,225,374 | 9/1980 | Kaufmann | 156/231 |

FOREIGN PATENT DOCUMENTS 41-152464  6/1976  Japan

Primary Examiner—John T. Goolkasian
Assistant Examiner—Louis Falasco
Attorney, Agent, or Firm—Pennie & Edmonds

[57] ABSTRACT

Distortions during printing and laminating are minimized by printing the design on a stable base, preferably release paper, and then transferring the printed design to a hot plastic web made continuously by an extruder. A stress relieved hot plastic film is then laminated to the printed web to provide a protective wear coat. To emboss in register with the printed design, the laminated product is first aligned by means of registration marks that are printed along with the design. Embossing is then made using a conventional engraved roll having raised sections which are images of the printed design. After embossing, the web is partially cooled and annealed. It is then aligned with a die cutter using the same registration marks as used for alignment during embossing. As a result, individual tiles can be cut automatically in register to the printed and embossed pattern.

11 Claims, 8 Drawing Figures

PRINTED AND EMBOSSED FLOOR COVERING AND METHOD AND APPARATUS FOR ITS MANUFACTURE

BACKGROUND ART

This concerns a printed and embossed material, suitable for use as a floor covering, and a method and apparatus for making it in a continuous process. More particularly, it concerns a multilayered material combining a base layer, a printed layer and a wear resistant layer, which is embossed in register with the print.

Reverse printed laminates have been made by laminating separate sheets of calendered base material and a preprinted plastic film. In continuous processes, the printed designs have been limited to random prints because of the difficulty of maintaining the desired dimensions in the preprinted plastic film, in the laminate and in some cases in the base material. The plastic film tends to stretch when it is being printed and subsequently dried. Since it is necessary to apply tension to the printed film during lamination in order to eliminate trapped air and wrinkles, the printed design can also be distorted during lamination.

Alternatively, tiles can be formed in batch processes with designs that are in register to the cut tile by laminating preprinted plastic sheets of silk screen designs to sheets of a suitable base material. The tiles can then be hand clicked from the sheets. The high cost of such a batch process makes in-register printed tile quite expensive and limits its acceptance.

An additional complication is imposed by the desirability of providing a textured surface by embossing the tile. In the prior art the embossing step can be another cause of distortion. As a result, embossing in register with a printed design has previously been restricted to embossing of a plastic surface layer that is integral with a nonplastic stable substrate such as asbestos or asphalt-saturated felt. Attempts to emboss unsupported plastic layers in register with a printed design have been unsuccessful because the plastic is easily distorted when moving it at the elevated temperatures necessary for embossing.

DISCLOSURE OF INVENTION

We have devised a continuous process suitable for producing tiles in which the design is in register with the tile. The process further permits the tile to be embossed in register with the design. Distortions during printing and laminating are minimized by printing the design on a stable base, preferably release paper, and then transferring the printed design to a hot plastic web made continuously. A stress relieved hot plastic film is then laminated to the printed web to provide a protective wear coat.

To emboss in register with the printed design, the laminated product is first aligned by means of registration marks that are printed along with the design. Embossing is then made using a conventional engraved roll having raised sections which are images of the printed design. After embossing, the web is partially cooled and annealed. It is then aligned with a die cutter using the same registration marks as used for alignment during embossing. As a result, individual tiles can be cut automatically in register to the printed and embossed pattern.

We have also found that it is possible to avoid the distortions created by embossing on a plastic substrate by supporting the plastic substrate on a belt which is not an integral part of the finished product. Furthermore, to avoid distorting the substrate and the printed design during alignment, alignment is performed by maneuvering the belt.

BRIEF DESCRIPTION OF THE DRAWINGS

These and other objects, features and elements of our invention will be more readily apparent from the following detailed description of the invention in which.

BEST MODE FOR CARRYING OUT THE INVENTION

Figure 1:
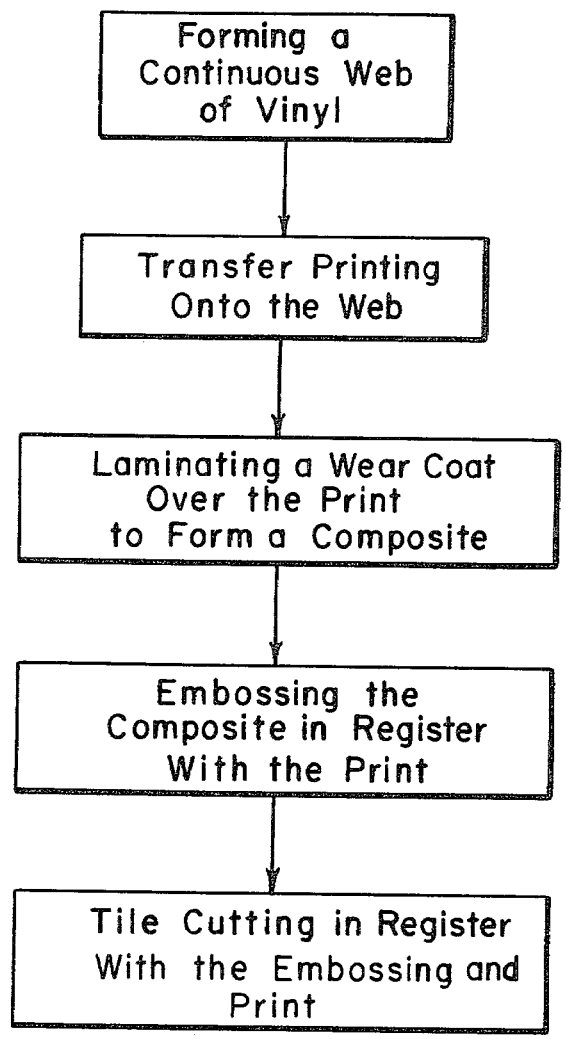
FIG. 1 is a block diagram illustrating the major steps followed in the practice of our invention.
Figure 2:
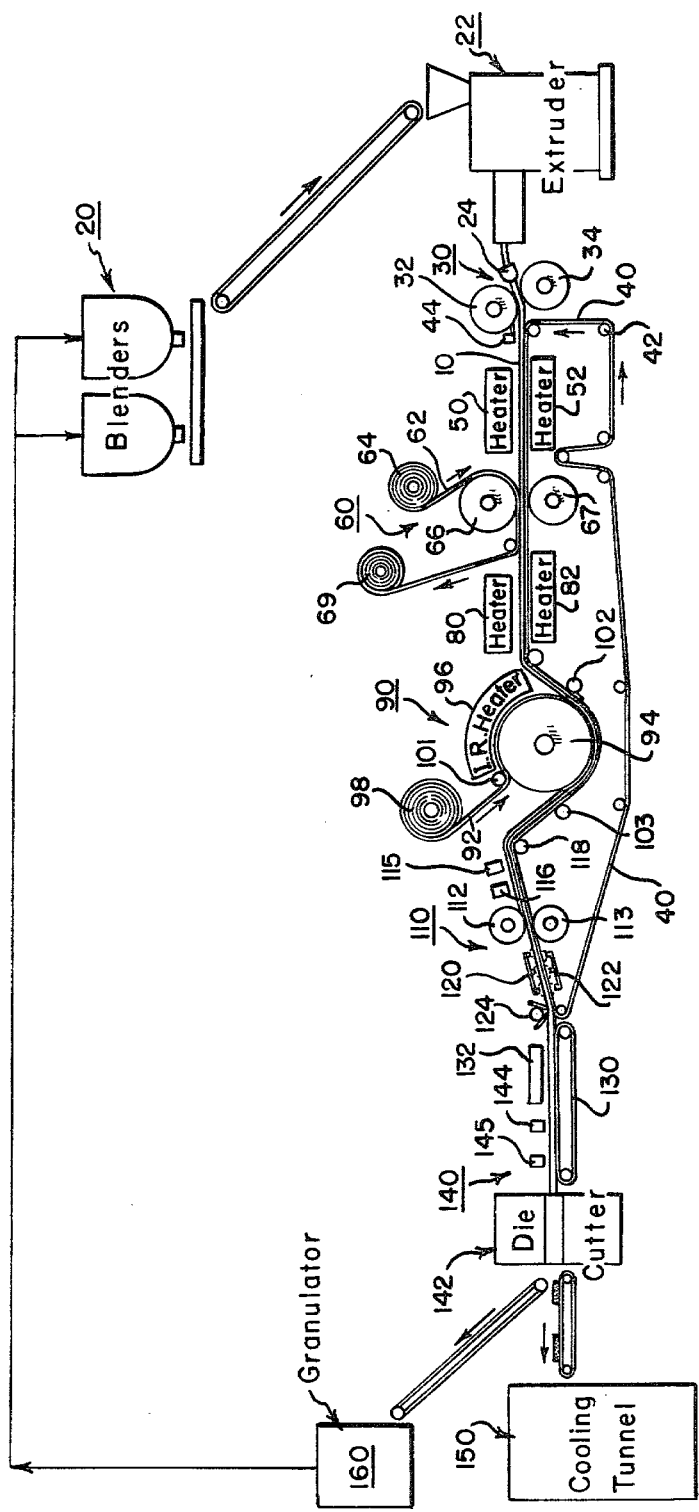
FIG. 2 is a schematic diagram of illustrative apparatus used in the practice of our invention.
Figure 7:
FIG. 7 is a cross-section of the base web, print layer and vinyl film after it has been embossed in register with the print by the embossing roll of FIG. 6.
Figure 8:
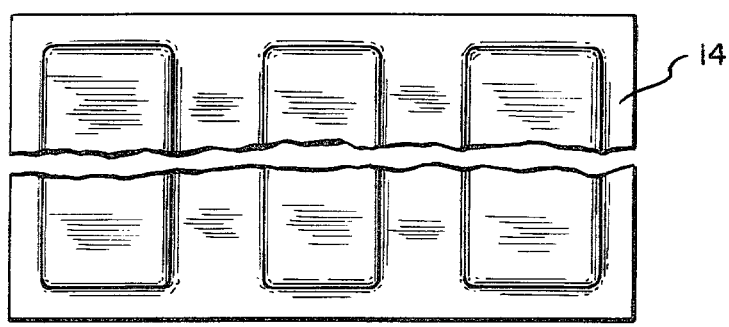
FIG. 8 is a plan view of a tile which has been embossed in register with the print using the embossing roll of FIG. 6.

FIGS. 1 and 2 illustrate a preferred method and apparatus for practicing our invention to make a solid vinyl tile on which is a decorative layer of print that has been embossed in register with the print. Cross-sectional and plan views of the finished tile are shown in FIGS. 7 and 8.

As shown in FIG. 1 the major steps followed in making such a tile comprise: forming a continuous web of vinyl, transfer printing on this web, laminating a protective wear coat over the print to form a composite, embossing the composite in register with the print, and tile cutting in register with the print. Preferably, the wear coat is annealed before laminating and the laminate is annealed before cutting. Infrared heating is used to raise the web and the wear coat to appropriate temperatures for transfer printing, laminating, and annealing; and the tiles are cooled after cutting before they are packaged.

Figure 3:
FIG. 3 is a cross-section of a base web used in the practice of our invention.

Specific apparatus for performing the steps of FIG. 1 is shown in FIG. 2. A continuous base web of vinyl is prepared by mixing its constituents in blenders 20 and extruding the base web from an extruder 22 and die 24. A calender 30 comprising a pair of planishing rolls 32, 34 produces a continuous hot plastic base web 10 having a surface smooth enough to receive a layer of print. As is known in the art, a doctor knife (not shown) may be used to separate base web 10 from the planishing rolls. A cross-section of a portion of base web 10 as it leaves the planishing rolls is depicted in FIG. 3. The thickness of this cross-section typically ranges from about 30 to 120 mils (0.75 to 3 mm.). The width of this cross-section is about 14 inches (35 cm.) Other dimensions, however, may be used in the practice of our invention.

Hot plastic web 10 flows continuously onto a moving carrier belt 40 which is made of a material such that the web will adhere to the belt when the web is hot, but can be removed from it when the web is cool. Typically, such a carrier belt is made of woven fiberglass impregnated with a silicone elastomer. Carrier belt 40 moves base web 10 through the printing, laminating and embossing stages, supporting the web during these steps. To avoid distorting the plastic web and the design printed thereon, the web is guided and aligned by adjusting the carrier belt by means of a guidance system 42. Near calender 30, a loop speed sensor 44 is used to control the speed of the carrier belt so that the hot plastic web leaves planishing rolls 32, 34 at a constant speed.

As it is moved away from calender 30, web 10 is heated to the temperature required to obtain transfer of print from a pre-printed release paper to the web. A first infrared heater 50 heats web 10 directly; and a second infrared heater 52 heats carrier belt 40 which, in turn, heats web 10. For the transfer printing system used in the practice of the preferred embodiment of our invention, this temperature is about 250° F. (121° C.).

Next, the web enters a transfer printing station 60 that transfers a layer of print from a preprinted release paper 62 to web 10. The print layer can form any kind of design. For high-volume commercial production of tiles the design is preferably one that permits tiles to be cut with the design centered in the tile so that it is in register with the edges of the tile.

The preprinted paper is fed from a supply roll 64, through transfer rolls 66, 67 to a takeup roll 69. In practicing our invention we have found it useful to cool roll 66 to about 70° F. (21° C.) to facilitate transfer printing. To ensure proper alignment of the printed paper in a transverse direction, an edge guidance system (not shown) is used. Moreover, to permit splicing of rolls of preprinted paper it is preferable to use conventional splicing equipment (not shown) including an unwind roll stand, a splice table and a compensator that allows time to splice the printed design in register.

Figure 4:
FIG. 4 is a cross-section of a base web after a print layer has been transferred to it accordance with our invention.

To transfer the layer of print from the release paper, paper 62, web 10 and carrier belt 40 are fed through the nip formed by rolls 66, 67; and the paper is then separated from the web. Advantageously a release plate (not shown) can be used at the point of separation of paper 62 from web 10 and takeup roll 69 can be provided with suitable tension control devices. A cross-section of the printed web depicting base web 10 and a print layer 12 is shown in FIG. 4. This cross-section is not to scale because the thickness of the print layer is quite small (0.0025 to 0.025 mm.) compared to the 0.75 to 3 mm. thickness of base web 10.

After printing, an infrared heater 80 heats the printed web directly and another infrared heater 82 heats carrier belt 40 and therefore the printed web. The web is then fed into a laminating station 90 where a web 92 of vinyl film is laminated to the printed side of web 10 to provide a protective wear coat. Laminating station 90 comprises a heated drum 94, an infrared heater 96, a supply roll 98 and rollers 101, 102 and 103. In addition, the station preferably includes conventional splicing equipment (not shown) including an unwind roll stand, a hot splicer and a compensating device which allows time to splice the film.

Supply roll 98 provides a continuous web of preformed vinyl film that is applied by rubber pressure roller 101 to the surface of drum 94. Typically the vinyl film is from 3 to 12 mils (0.075 to 0.3 mm) in thickness. Roller 101 is designed to form a smooth uniform film on roller 94 with no bubbles or wrinkling. The film on drum 94 is heated to sufficient temperature to remove any strain which might cause the finished product to curl, distort or shrink. For the films used in the practice of the preferred embodiment of the invention, the temperature of web 92 is raised to approximately 350° F. (177° C.) by heating drum 94 to about 340° F. (171° C.), as well as using infrared heater 96.

Figure 5:
FIG. 5 is a cross-section of the base web after a vinyl film has been laminated over the print layer.

Web 92, the printed web, and carrier belt 40 pass through the nip formed by drum 94 and roller 102; and web 92 is laminated to the printed web to form a composite 16 in which print layer 12 is located between webs 92 and 10. At the nip formed by roller 103 and drum 94, composite 16 adheres to carrier belt 40 and strips away from laminating drum 94. A cross-section of composite 16 showing a vinyl wear coat 14 over print layer 12 is shown in FIG. 5.

Figure 6:
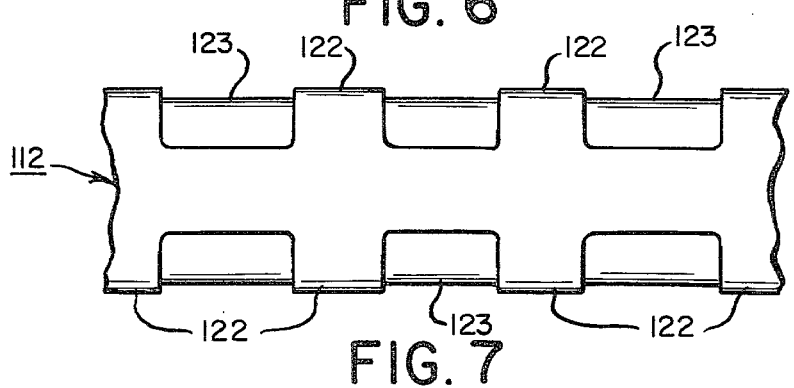
FIG. 6 is a view of an embossing roll used in the practice of our invention.

The carrier belt then moves the composite to an embossing station 110. This station comprises an embossing roll 112, a rubber backup roll 113 and means for transverse and longitudinal positioning of the laminated web. As shown in FIG. 6, embossing roll 112 is an engraved or etched steel or copper roll having areas 122 that are raised above other areas 123 on the roll. Typically the difference in height between areas 122 and 123 averages about 6 to 14 mils (0.15 to 0.35 mm.). Preferably, areas 122 constitute an image of the design that is transfer printed onto the base web. Both the embossing roll and the backup roll are water cooled.

The positioning means includes two electric eyes 115, 116, positioning roll 118 and a speed control means (not shown). The electric eyes sense registration marks which are printed on the web along with the printed design. Electric eye 115 controls positioning roll 118 which guides composite 16 in transverse direction so that the embossing roll areas 122 are in register with the images on the printed web. Electric eye 116 controls the speed of the embossing roll so that embossing roll areas 122 are in register in the longitudinal direction with the printed pattern on the web. Specific apparatus for producing transverse and longitudinal registration with the embossing roll include a Fife photoelectric line control and a Bobst Champlain registron control, respectively. Numerous other devices will be apparent to those skilled in the art.

Composite 16 and belt 45 pass through the nip defined by embossing roll 112 and backup roll 113; and raised areas 122 of the embossing roll form corresponding depressions in the composite. A cross section of an embossed composite 18 is formed by this step is shown in FIG. 7 and a plan view in FIG. 8.

After passing through the nip formed by rollers 112 and 113, embossed composite 18 is cooled to a low enough temperature that the embossed composite 18 can be stripped from silicone carrier belt 40. The upper surface of composite 18 is cooled directly by a first water spray 120; and a second water spray 122 is used to cool the carrier belt and therefore the bottom surface of the composite. In practicing the preferred embodiment of our invention we have found it satisfactory to cool composite 18 to about 120° F. (49° C.). Excess water is then removed from the web by a high velocity air knife 124; and the embossed web is stripped from carrier belt 40.

At this point the carrier belt reverses direction. The embossed web, however, moves onto a conveyor belt 130 which carries it through an annealing station 132 which removes the strains imparted by laminating and embossing. After annealing the embossed web enters a tile cutting station 140 where it is aligned and cut into tiles in register with the pattern printed on the web. Tile cutting station 140 comprises a tile cutter 142, electric eyes 144, 145, and equipment responsive to signals from the electric eyes for aligning the web in the transverse and longitudinal directions.

Specific apparatus for aligning embossed composite 18 will be apparent to those skilled in the art from the teaching of Barchi et al.'s U.S. Pat. No. 3,465,384 entitled "Apparatus for Registration of Plastic Web," which is incorporated herein by reference. As disclosed in that patent, a plastic web 6 is fed on a conveyor belt 28 into a tile cutter 36. Photocells 32, 34 are used to maintain the desired transverse position of the plastic web by driving a reversible motor 128 that controls the lateral position of conveyor 28. The photocells sense the lateral position of the plastic web by sensing a continuous longitudinal stripe 92 that is embossed in the plastic web at the same time as a design is embossed in the remainder of the web. In like fashion in the present invention, electric eyes 144, 145 sense registration marks that are printed on the web along with the printed design. Advantageously these registration marks can be the same as those used to align the web at the embossing station. Numerous closed loop feedback systems for control of both lateral and longitudinal position of the web will be apparent.

After cutting, the tiles are conveyed to a cooling tunnel 150 where they are cooled to ambient temperature. Scrap from the tile cutting operation is fed to a granulator 160 and returned to blenders 20 for further use.

In practicing our invention we have found that the following is a preferred formulation for base layer 10:

|  | Weight Percent |
|---|---|
| Vinyl Chloride - Vinyl Acetate Copolymer | 13.5 |
| Butyl Benzyl Phthalate | 5.0 |
| Epoxidized soybean oil | 0.3 |
| 50 mesh Limestone | 50.0 |
| 325 mesh Limestone | 30.9 |
| Barium Stearate | 0.3 |
|  | 100.0 |

This formulation is relatively low in cost and can be processed through an extruder. The inherent viscosity for a suitable vinyl chloride-vinyl acetate copolymer resin, which has a vinyl acetate content of 14% by weight acetate units, is 0.50 as measured by ASTM D1243-66. A conventional resin of this type is Tenneco 314.

Other formulations (including non-vinyl formulations) for the base layer will be evident to those skilled in the art. We have found that vinyl compositions should comprise a minor portion of plasticized vinyl chloride polymer, and/or vinyl acetate copolymer containing at least 80% vinyl chloride, and a major portion of mineral filler, the minor portion constituting about 16 to 25% by weight and the major portion about 75 to 84% by weight.

Release paper 62 should be made from 30 to 40 pound (basis weight) paper stock (preferably 30 pounds) and coated with a suitable release coat. Such release papers are readily available commercially. The inks that are used should be conventional vinyl rotogravure inks in whatever colors are desired. Typically, one color is used to provide a background and one or more additional colors to provide the desired pattern. The patterns that can be achieved encompass the full range of gravure printing. Halftones and shading are readily achievable.

A preferred formulation for vinyl film 92 is as follows:

|  | Weight Percent |
|---|---|
| Polyvinyl Chloride | 76.05 |
| Dioctyl Phthalate | 19.01 |
| Epoxidized soybean oil | 3.80 |
| Barium Cadmium Laurate | 1.14 |
|  | 100.0 |

The inherent viscosity for a suitable polyvinyl chloride resin is 0.90 as measured by ASTM D1234-66. A conventional resin of this type is Tenneco 200.

Alternative formulations for the vinyl film will be apparent. For example a plasticized vinyl chloride polymer and/or vinyl acetate polymer containing at least 90% vinyl chloride may generally be used.

The operating temperatures set forth above are preferred. Operating ranges for the case where the plastic base web and the plastic wear layer are vinyl compositions are as follows. The plastic base web 10 is heated to an average temperature in the range of about 200° F. to 280° F. (93° C. to 138° C.) prior to transfer printing; the release paper 62 is heated to an average temperature in the range of about 60° F. to 150° F. (16° C. to 66° C.) prior to transfer printing; the vinyl wear layer is heated to an average temperature in the range of about 330° F. to 350° F. (166° C. to 177° C.) prior to laminating; and the vinyl wear layer and the plastic base web are heated to an average temperature in the range of about 270° F. to 310° F. (132° C. to 154° C.) during lamination. The embossing roll is cooled to an average temperature in the range of about 60° F. to 80° F. (16° C. to 27° C.) and the embossed web is cooled to achieve an average web temperature in the range of about 110° F. to 140° F. (43° C. to 60° C.) before cutting.

As will be apparent many of the individual pieces of apparatus used in practicing our invention are conventional. Extrusion equipment, heaters, printing stations, laminating stations, embossing stations, die cutting equipment and aligning apparatus are old. However, the combination of this equipment to produce, on a continuous basis, tile that is embossed in register with print is new. Moreover, the combination of these devices to produce a solid plastic tile in register with a printed design is also new. Numerous modifications in the above described invention will be apparent to those skilled in the art.

What is claimed is:

1. A method of making, on a continuous basis, a composite vinyl tile comprising the steps of:
   forming a continuous base web on a moving supported surface, said web being formed from a vinyl composition, said moving surface being made of a material such that the base web will adhere to the surface when the web is hot but can be removed from it when the web is cooled,
   raising the temperature of said plastic web,
   transferring a printed design from a pre-printed stable carrier sheet to the continuous base web after said web has been heated, said printed design being formed by a vinyl material compatible with said base web, said printed design including a first portion which constitutes a decorative design for the finished product and a second portion which provides registration indicia for use in the manufacture thereof, laminating a clear plastic wear layer over the printed design on the hot base web, after the web is laminated, aligning the web by means of the printed registration indicia so that the web is aligned with an embossing roll in both the direction transverse to the direction of travel of the web and the direction that is the same as the direction of travel of the web, mechanically embossing the printed side of the base web with depressions in registration with the printed decorative design, cooling the base web, stripping the cooled web from the moving surface, after it has been stripped from the moving surface, annealing the web to remove the strains imparted by laminating and embossing, aligning the annealed web by means of the printed registration indicia so that the web is aligned with a cutting tool in both the direction transverse to the direction of travel of the web and the direction that is the same as the direction of travel of the web, cutting the continuous base web into discrete tiles so that the decorative design is in register with the edges of the tile, and cooling the cut tiles.

2. The method of claim 1 wherein said plastic base sheet is formed from a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

3. The method of claim 1 wherein said plastic base sheet is made of a material having substantially the following composition:

| Component | Weight Percent |
| --- | --- |
| Vinyl Chloride-Vinyl Acetate Copolymer | 13.5 |
| Butylbenzyl Phthalate | 5.0 |
| Epoxidized Soybean Oil | 0.3 |
| 50 mesh Limestone | 50.0 |
| 325 mesh Limestone | 30.9 |
| Barium Stearate | 0.3 |

-continued

| Component | Weight Percent |
| --- | --- |
|  | 100.0 |

4. The method of claim 1 wherein said plastic composition material is a vinyl ink.

5. The method of claim 1 wherein the stable carrier sheet for the printed design is a release coated paper having an average basis weight in the range between 30 and 40 pounds and coated with a suitable release coating.

6. The method of claim 1 wherein said clear plastic wear layer is a vinyl film comprising a plasticized vinyl chloride polymer, and/or vinyl acetate copolymer, containing at least 90% vinyl chloride.

7. The method of claim 1 wherein said clear plastic wear layer has substantially the following composition:

| Component | Weight Percent |
| --- | --- |
| Polyvinyl Chloride | 76.05 |
| Dioctyl Phthalate | 19.01 |
| Epoxidized Soybean Oil | 3.80 |
| Barium Cadmium Laurate | 1.14 |

8. The method of claim 1 wherein said plastic base web has an average thickness in the range of 30 to 120 mils (0.75 to 3 mm.), the printed design has an average thickness in the range of 0.1 to 1 mil (0.0025 to 0.025 mm.), the plastic wear layer has an average thickness in the range of about 3 to 12 mils (0.075 to 0.3 mm.) and the embossing depressions have an average depth in the range of about 6 to 14 mils (0.15 to 0.35 mm.).

9. The method of claim 1 wherein the plastic base web and the plastic wear layer are vinyl compositions and the plastic base web is heated to an average temperature in the range of about 200° F. to 280° F. (93° C. to 138° C.) prior to transfer printing, the stable carrier sheet is heated to an average temperature in the range of about 60° F. to 150° F. (16° C. to 66° C.) prior to transfer printing, the clear plastic wear layer is heated to an average temperature in the range of about 330° F. to 350° F. (166° C. to 177° C.) prior to laminating, and the clear plastic wear layer and the plastic base web are heated to an average temperature in the range of about 270° F. to 310° F. (132° C. to 154° C.) during lamination.

10. The method of claim 9 wherein the embossing roll is cooled to an average temperature in the range of about 60° F. to 80° F. (16° C. to 27° C.) and the embossed web is cooled to achieve an average web temperature in the range of about 110° F. to 140° F. (43° C. to 60° C.) before cutting.

11. A flooring tile made by the method of claim 1.

* * * * *